United States Patent [19]

Gentry

[11] Patent Number: 5,558,488
[45] Date of Patent: Sep. 24, 1996

[54] APPARATUS FOR STACKING BOOKS

[75] Inventor: Glenn M. Gentry, Harrisonburg, Va.

[73] Assignee: R.R. Donnelley & Sons Company, Inc., Chicago, Ill.

[21] Appl. No.: 264,959

[22] Filed: Jun. 24, 1994

[51] Int. Cl.[6] .................................................. B65G 57/11
[52] U.S. Cl. .............................. 414/790.4; 414/790.7; 414/794.4
[58] Field of Search ............................... 414/790, 790.4, 414/790.7, 790.8, 794.4; 271/261

[56] References Cited

U.S. PATENT DOCUMENTS

| | | | |
|---|---|---|---|
| 3,381,830 | 5/1968 | Vasse | 414/790.4 |
| 3,418,895 | 12/1968 | Palmer | 414/790 |
| 3,420,386 | 1/1969 | Morrow et al. | 414/790 |
| 3,429,239 | 2/1969 | Murchison et al. | 414/790 |
| 3,479,932 | 11/1969 | Stal et al. | 414/790.4 |
| 3,526,170 | 9/1970 | Oderman et al. | 414/790.4 |
| 4,027,580 | 6/1977 | Sundin | 414/790.7 |
| 4,525,118 | 6/1985 | Bulka et al. | 414/790.7 |
| 5,054,993 | 10/1991 | Watts et al. | 414/790.4 X |
| 5,114,306 | 5/1992 | Sjogren et al. | 414/790.4 |
| 5,172,907 | 12/1992 | Kalisiak | 271/261 X |

*Primary Examiner*—David A. Bucci
*Attorney, Agent, or Firm*—Samuel Shipkovitz; Gray Manuel

[57] ABSTRACT

The present invention discloses a high speed apparatus for stacking books received from a delivery conveyer and accounting for the books and the operation of the stacker as part of a manufacturing data and control system. The apparatus is formed of an input conveyer system, a stacking region, sets of forks for intercepting a predetermined number of the books to form a stack, mechanical apparatus such as pairs of chains for moving the sets of forks in and out of the common pathway stacking region, and a real-time control device for controlling the timing and movement along the substantially common pathway of the sets of forks. The forks are in substantially the same dimensions of vertical attitude and horizontal plane when within the stacking region when each stack is being formed and the sets of forks could theoretically overtake each other during a cycle since they are in the above-noted substantially common pathway.

37 Claims, 9 Drawing Sheets

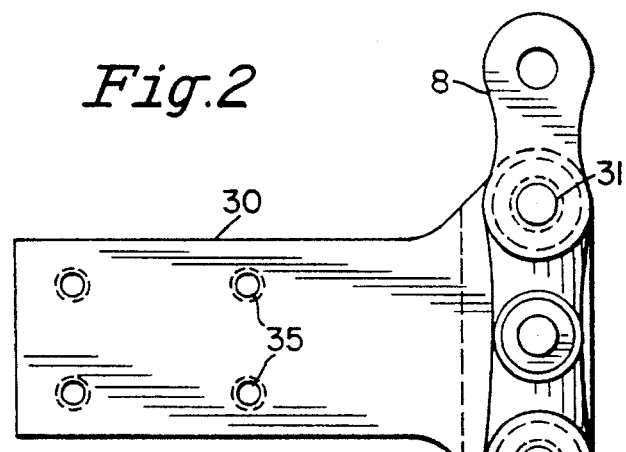
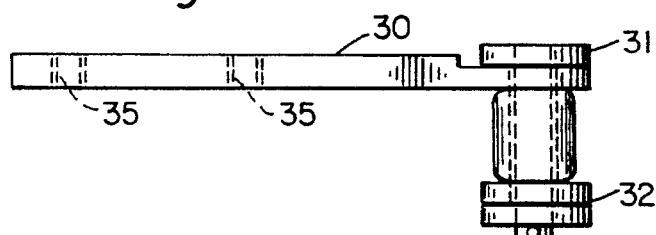
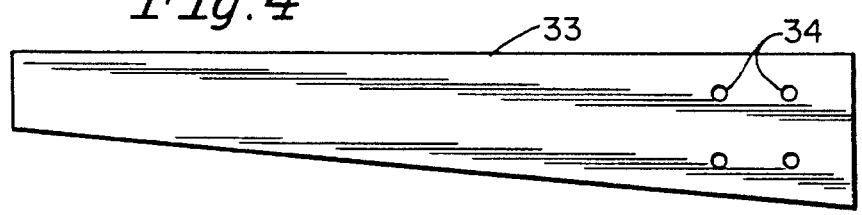
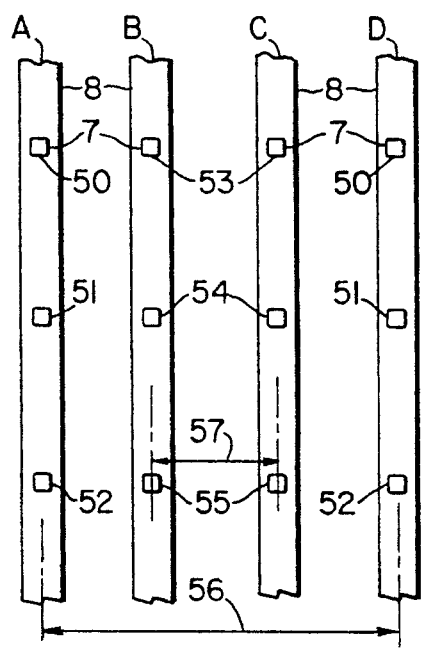
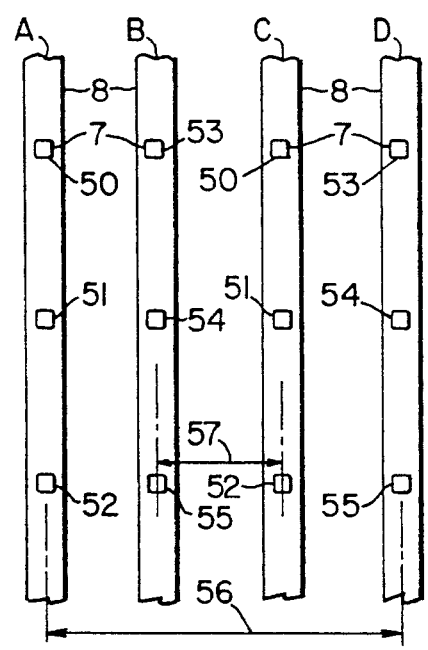

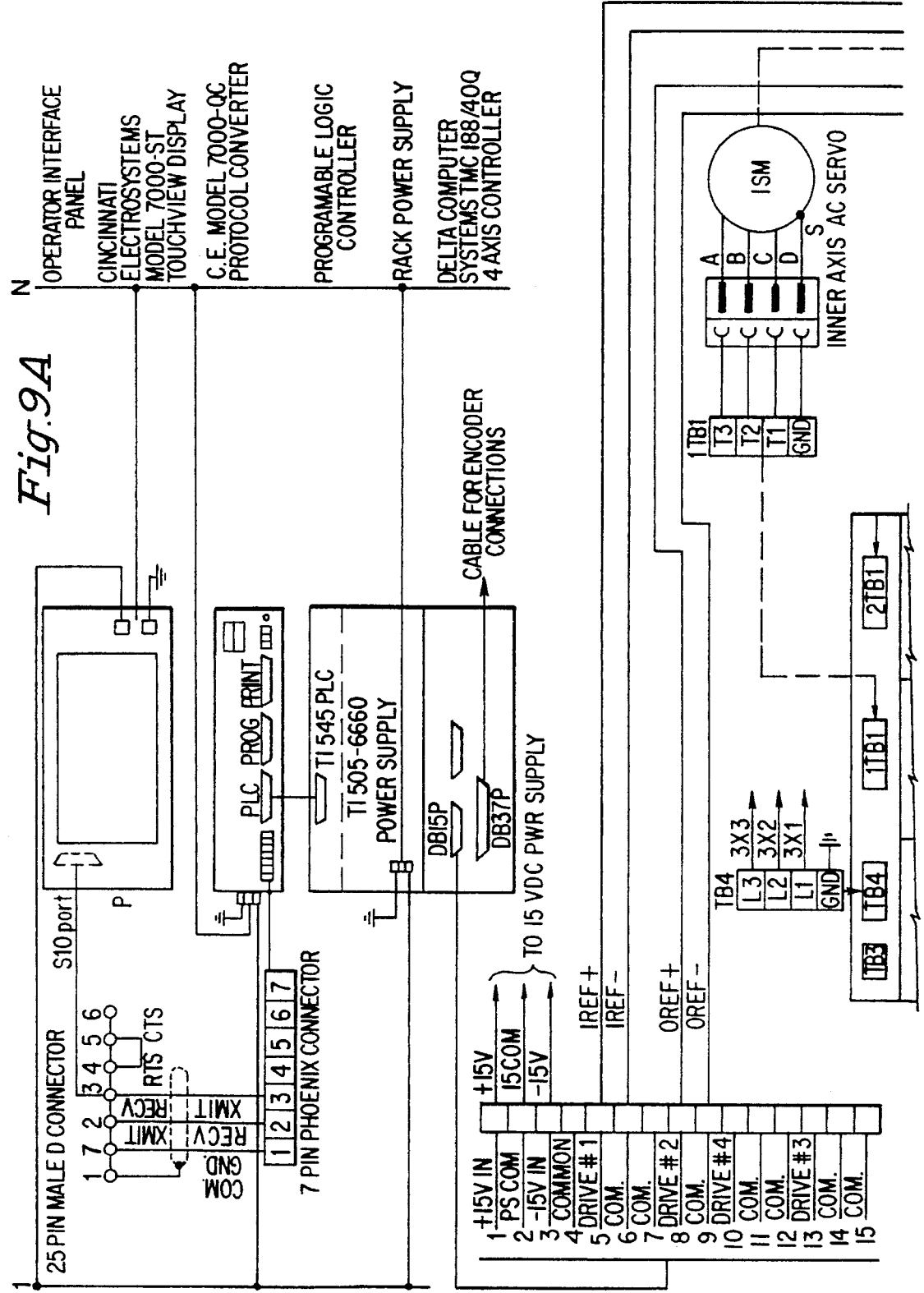

APPARATUS FOR STACKING BOOKS

BACKGROUND OF THE INVENTION

The present invention generally relates to the field of automated article stacking systems, and more particularly, is directed to a high speed apparatus for stacking books received from a delivery conveyer and accounting for said books and the operation of the stacker as part of a manufacturing data and control system.

Present day printing and binding of books, magazines and the like is a very competitive business and depends on a high degree of efficient mechanization. The printed products usually are conveyed at high speed to a stacking device which forms a stack of a predetermined number of the product on a stacking platform. An operator can then remove the stack for boxing or placing on a pallet.

Damage to the printed product at the early stages of production may simply require a somewhat longer press run, thus requiring only a little additional labor and materials. However, because print product production is not continuous, product damage near the end of the process is more serious. If not avoided, such product damage may require an additional production run for re-printing or re-binding of additional material required to meet obligations for the delivery of specific quantities of printed products.

Such re-printing and re-bindings are significantly more expensive than the cost of producing good product in a single production run. It is therefore, quite desirable to minimize, to the greatest extent possible, damage to otherwise good product resulting from the preparation of finished product for shipment.

SUMMARY OF THE INVENTION

The present invention relates to a method and apparatus for more efficient stacking and loading of bound printed products. In accordance with the present invention, the speed with which such products may be stacked, loaded and made ready for shipment can be greatly increased while at the same time reducing the amount of product damage during the manufacturing and loading process. Such product damage is extremely difficult and expensive to rectify when it occurs at the completion of the manufacturing process.

It is, therefore, an important object of the present invention to employ process control technology so as to significantly reduce the amount of damage to expensive printed material, such as books, as they are being stacked and loaded in cartons for shipping purposes.

Another important object of the present invention is to accomplish such stacking and loading in a manner much faster than is known in the prior art.

Another object of the present invention is to provide a book stacking apparatus which can be operated by a single individual.

Another object of the present invention is to provide a book stacking apparatus with a high degree of technical sophistication which is economical to manufacture and can be easily repaired and maintained.

Another object of the present invention is to provide a book stacking apparatus which can be readily setup for a plurality of different stacking operations.

A review of the prior art discloses U.S. Pat. Nos. 4,678,387; 5,226,780 and 5,114,306, all to Sjogren et al. All of these patents disclose apparatus which use predictive rather than sensor-based or real-time control. The apparatus of these patents also are not part of a manufacturing data and control system.

The dual drive chains of the Sjogren '306 patent are a side-by-side system and the buckets described in the patent can not pass each other. The Sjogren apparatus has traveling buckets while the stacking forks of the instant invention are directly attached to the chains. The Sjogren apparatus also uses a sprocket system rather than the take-up-plate system of the instant invention. Thus, the take-ups of the instant invention can be separate as opposed to the Sjogren system (see FIG. 5 of the Sjogren '306 patent).

Additionally, the Sjogren apparatus uses a stepper motor system having 800 steps of movement, while the three axis robot system with servo-control of the present invention allows for 30,000 increment precision movement. In addition, the Sjogren apparatus does not detect jams since it is predictive but instead counts pulses. The instant invention uses a sensor to detect an overload in the overload protection clutch in the drive system. Moreover, the tensioning system for the chain set of the Sjogren apparatus is screw-based, rather than the movable tensioning plate of the instant invention.

Unlike prior art devices, the instant invention may be part of a real-time, factory-wide, computer system for data and control which may be remotely controlled with rare human interaction during normal operations.

U.S. Pat. No. 3,548,945 to Oderman, Wiseman et al disclose a hardwired, non-programmable, fork elevator operation while operating the stacking region.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is side view of the chain and fork mounting plate for the stacking apparatus illustrated in FIG. 1.

FIG. 3 is a top view of the chain and fork mounting plate for the stacking apparatus illustrated in FIG. 1.

FIG. 4 is a side view of the fork tong which attaches to the fork mounting plate illustrated in FIGS. 2 and 3.

FIG. 5 is a schematic representation of the arrangement of the chains and forks for the stacking apparatus illustrated in FIG. 1.

FIG. 5A shows an arrangement of chain pairs AD and BC with fork sets 50,51, 52 associated with pair AD, and fork sets 53,54, 55 associated with pair BC. FIG. 5B shows an arrangement of chain pairs AC and BD with associated fork sets.

FIGS. 9A, 9B, 10–11 illustrate the control logic used for one embodiment of the control unit for the present invention.

DESCRIPTION OF THE PREFERRED EMBODIMENT

The present invention will now be described with reference to the accompanying drawings.

Figure 1:
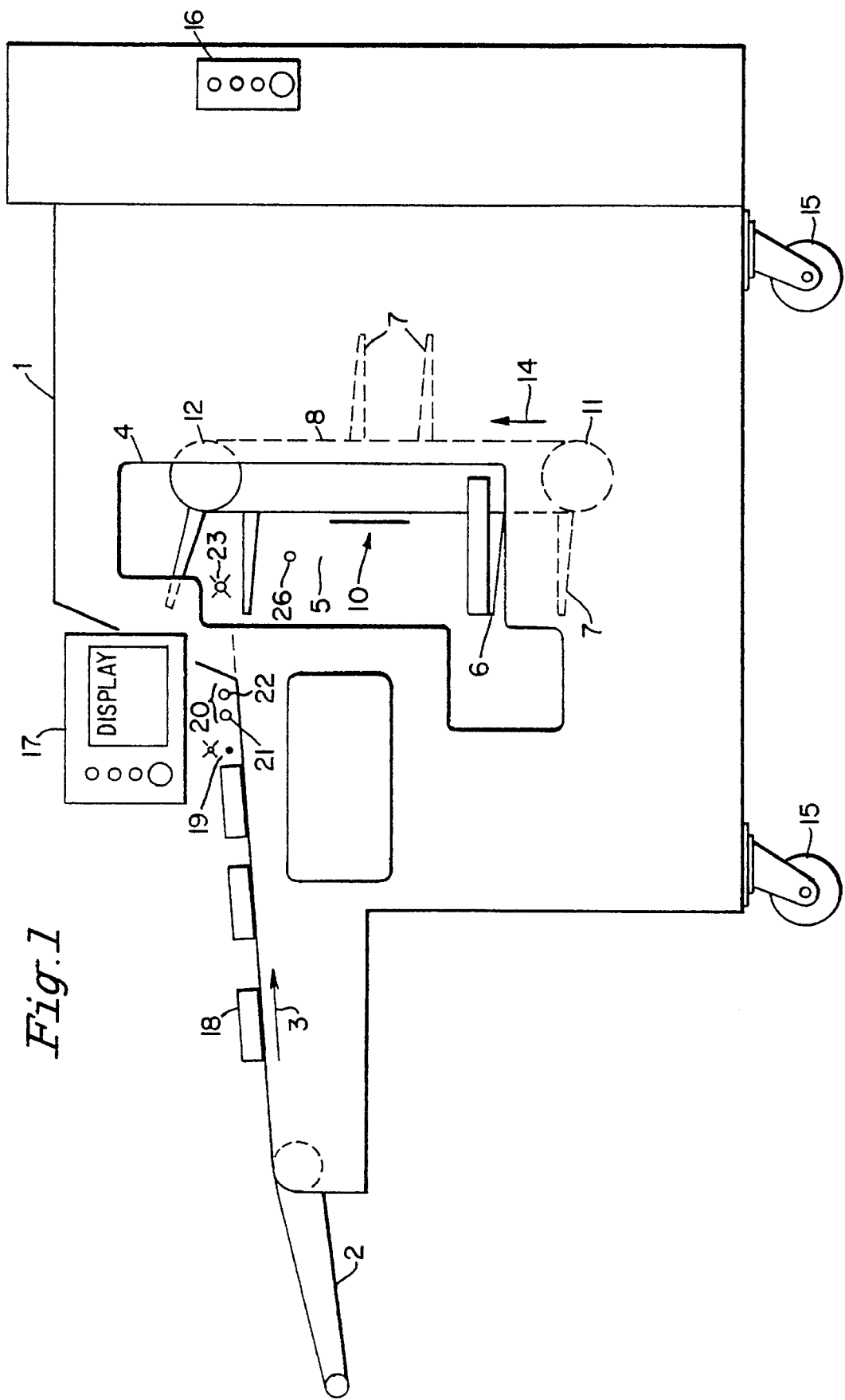
FIG. 1 is a side elevational view of a stacking apparatus in accordance with the present invention.

FIG. 1 illustrates a book stacking apparatus 1 in accordance with the present invention. The apparatus includes an inlet feeder 2 which feeds a continuous stream of books 18 into the apparatus for stacking from an adjacent transport conveyer (not shown). The books travel along conveyer 2 in the direction of arrow 3 to a stacking unit 4.

Stacking unit 4 includes a stacking region, generally indicated by reference No. 5, a stacking platform 6 and a plurality of stacking forks 7. As described below, cooperating pairs of stacking forks 7 are carried along a closed loop path by a plurality of linked chains 8 of the type known in the prior art and illustrated in FIG. 2. As shown in FIGS. 2 and 3, each fork includes a mounting plate 30 which is attached to chain 8 using appropriate mounting hardware 31 and 32. As illustrated in FIG. 4, a fork tongue 33 is attached to mounting plate 30 using fastening devices through holes 34 formed in fork tong 33 and corresponding holes 35 formed in mounting plate 30. The fastening devices may include bolts, screws and rivets of the type well known in the prior art.

With reference again to FIG. 1, the closed loop path formed by chain 8 includes a linear portion 10 within stacking region 5. Chain 8 carries stacking forks 7 around lower roller 11 and upper roller 12 in a counter-clockwise direction as indicated by arrow 14.

In the preferred embodiment, four chain 8s are provided which lay along the same vertical plane as illustrated in FIG. 5. In FIG. 5A: chains A and D, with their respective forks 7, cooperate to form three sets of stacking forks 50, 51, and 52. Chains B and C, with their respective forks 7, also cooperate to form three sets of stacking forks 53, 54 and 55.

Chains A and D are spaced apart a distance 56 which is sufficiently wide to support a stack of books on each pair of cooperating forks 7. Chains B and C are similarly spaced a distance 57.

The chains have small links to increase speed and provide a small lever effect, and thus, a small chordial effect. In order to avoid drift, each chain apparatus, including gears and holding frame, has its own proximity detector located on a movable top idler plate associated with each chain to achieve the correct tension at the home position so that an automatic homing system is achieved by having a notch button or the like associated with each fork on the chain so that the fork set that just dropped off books will go to the correct rest/home position. See, for example, FIG. 8.

As further illustrated in FIG. 1, the stacking apparatus of the present invention also includes a plurality of wheels 15 so that the apparatus can be readily moved from one location to another and an electrical power control panel 16 which provides electrical power to the apparatus.

The control of the speed and timing of movement of chains 8, and associated forks 7, as well as the response to various controls signal operating conditions of the apparatus, are performed by control unit 17 which will be described in greater detail below.

The apparatus of FIG. 1 also includes a number of safety features. One such feature detects the presence of books which are not correctly positioned on inlet feeder 2 and could lead to improper stacking or a book jam in stacking region 5. Accordingly, a plurality of alignment sensors 19 may be provided along the path of inlet feeder 2 and stacking region 5. Sensor 19 may be formed of photocells, capacitative proximity detectors and the like of the type which are known in the art. Accordingly, when any one of alignment sensors 19 detects that a book is not in the proper alignment, a control signal is generated by sensor 19 and sent to the control unit signaling the misalignment condition. Control unit 17 may then take the appropriate control action which may include sounding an alarm to the user or stopping the stacking operation.

The apparatus of FIG. 1 also includes a book speed sensor 20. The purpose of this sensor is to monitor the speed at which the stream of books are entering stacking region 5 from inlet feeder 2. If books are entering stacking region 5 at a higher speed than the stacking operation can accommodate, speed sensor 20 indicates this condition to control unit 17. Control unit 17 may thus take the appropriate control action, including sounding an alarm to the user or slowing or stopping the stacking operation. Book speed may be sensed and determined continuously or only at the time stacking forks 7 need to be moved into or out of stacking region 5.

Speed sensor 20 may be formed of a pair of photocells or proximity detectors 21 and 22 which are spaced a predetermined distance apart. The amount of time which it takes the leading edge of a book 18 to pass between detectors 21 and 22 is a function of the speed of the book. This information may then be used by control unit 17 to determine the speed of the stream of books on the conveyor belt as well as to count the number of books.

Another safety feature provided by the apparatus of the present invention is the ability to insure that the jacket or cover on books which carry a jacket do not flare up as the books progress along inlet feeder 2 and through stacking region 5. In order to provide this feature, at least one controlled air jet 23 is positioned in stacking region 5. Air jet 23 directs a blast of high velocity air toward each book as it passes by. The blast of air forces the book jacket to remain in close proximity to the book and not flare up. Flaring up of the jacket could interfere with the stacking operation. The blast or pulse of air may be triggered by a photocell, capacitative proximity detector which detects the presence of a book. The blast may also be triggered by a photocell located above the expected height or thickness of the book which triggers the blast of air upon a cover being loose and causing the photocell beam to be momentarily blocked.

Another sensor, usually a photocell 26, may be located in the stacking region just above the expected height of the stack after the fork set has moved down the thickness of the book just received. If the sensor detects anything at a period in time somewhat after the fork set has moved down, this would indicate that a hopper jam has occurred and appropriate action such as automatic stopping of the chain set and conveyor belt as programmed in the control unit.

Figure 6:
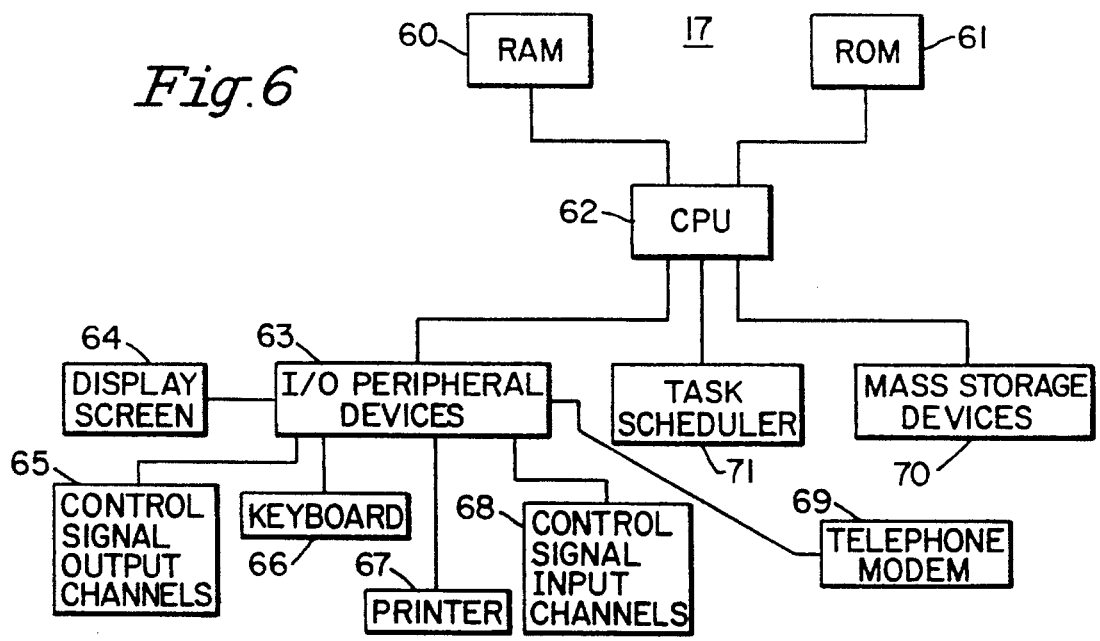
FIG. 6 is a block diagram of the control unit which controls the operation of the stacking apparatus illustrated in FIG. 1.

FIG. 6 is a block diagram illustrating the basic construction of control unit 17. As FIG. 6 shows, control unit 17 includes a number of interrelated elements such as RAM memory 60 and ROM memory 61 where instructions and temporary data storage areas of a computer program reside. Control unit 17 also includes input/output (I/O) peripherals 63 which allow the control unit to communicate with the user and the remainder of the stacking apparatus through such devices as display screen 64, control signal output channels 65, keyboard 66, printer 67, control signal input channels 68 and telephone modem 69.

Control unit 17 also includes mass storage devices 70 which allow the control unit to store data to and receive programming instructions from such peripheral devices as magnetic floppy disks and tape units or the like.

The heart of control unit 17 is central processing unit (CPU) 62 which supervises the flow of information between the various elements of the system and which perform logic calculations and other functions based on instructions in the computer program stored in RAM 60 and/or ROM 61 and data associated with the program. Task scheduler 71 is also connected to CPU 62. As further described below, tasks scheduler 71 helps CPU 62 supervise the flow of information between CPU 62 and the other elements which form the stacking apparatus of applicant's invention.

The purpose and operation of task scheduler 71 will be explained below with reference to present day large-scale computer systems. However, the explanation equally applies to the use of task scheduler 71 in the present invention.

Computer systems are usually quite sophisticated in operation and are often very expensive to manufacture and operate. In order to provide more access to such systems at a reasonable cost, the concept of "time sharing" was developed. In a time sharing computer system, a number of programs reside in the computer at the same time and seemingly run simultaneously. Each program is referred to as a task or job and though it may appear to the casual user that the computer is continuously devoting its full attention to the task being performed for the user, in actuality, each task receives only a fraction of the computer's time before the computer moves on to other tasks in "round-robin" fashion. In addition, there may be other tasks which perform internal functions for the computer system or which yield results which will eventually go to a person who is not currently using the computer.

In conventional computer systems, a facility known as an "interrupt" allows the execution of the CPU to be interrupted periodically based on requests for service from internal or external devices or based on the passage of a certain amount of time. When an interrupt occurs, the CPU stores information about the task it was performing when the interrupt occurred and then executes another task determined by the nature of the interrupt. The stored information allows the CPU to resume execution of the task which was interrupted once it has finished performing the task required by the interrupt. The CPU may also execute other tasks required by other interrupts before returning to the original task.

A time sharing computer system, whether it be driven by interrupts or by some other scheme, must have means for selecting the task which will be executed by the CPU and means for deciding how long the CPU will execute the task before reassigning the CPU to another task. Task scheduler 71 performs this function. The operation of task scheduler 71 is itself supervised by CPU 62. The CPU time spent supervising the operation of task scheduler 71 is overhead and should be minimized.

Tasks within a time sharing computer system can be divided into the following three categories based on the criticality of the timeliness of the computer response to external events related to the task:

(1) "Real-time" tasks where the essence of the computer function is to provide a rapid response to external events. An example of this type of task is the guidance control program for a missile. If the computer is unable to provide rapid response to course deviations or changing fuel weight, the missile will go off course.

(2) "Interactive" tasks where a delay in response is inconvenient and inefficient but is not disastrous. An example of this type of task is a computer program which provides information about a customer's account status to a bank teller. If the computer is unable to provide a rapid response, the teller's time will be wasted and a waiting customer will be annoyed, but the bank will suffer no other adverse consequences.

(3) "Background" tasks where response time to external events is not important. An example of this type of task is a program to print bank account summary statements at the end of the month.

Interactive tasks may be subdivided into two additional categories, those of relatively short duration and all others. It is desirable to give precedence to short interactive inquiries over requests for service which will take an extended period of time. For example, two bank managers may both issue "interactive" requests to the bank's computer. One request is to display the current balance for an account and the other request is to sort all accounts alphabetically and produce a complex report. It is, of course, desirable to give precedence to the short interactive request rather than to delay it while computing the complex report.

Various task schedulers are known in the prior art. One approach in wide use is to assign fixed priorities to each task and base the scheduling of tasks solely on these priorities. While this approach may be suited for dedicated real-time applications, it is unacceptable for interactive applications where the nature of the interactive request is more important than a previously specified priority. Another approach is to use a fixed "time-slice" to direct the CPU to one task after another in a round-robin fashion. This approach has the effect of giving all tasks equal priority. For the most part, task scheduler 71 in the present invention relies on fixed priorities to control the operation of each task.

Figure 9B:
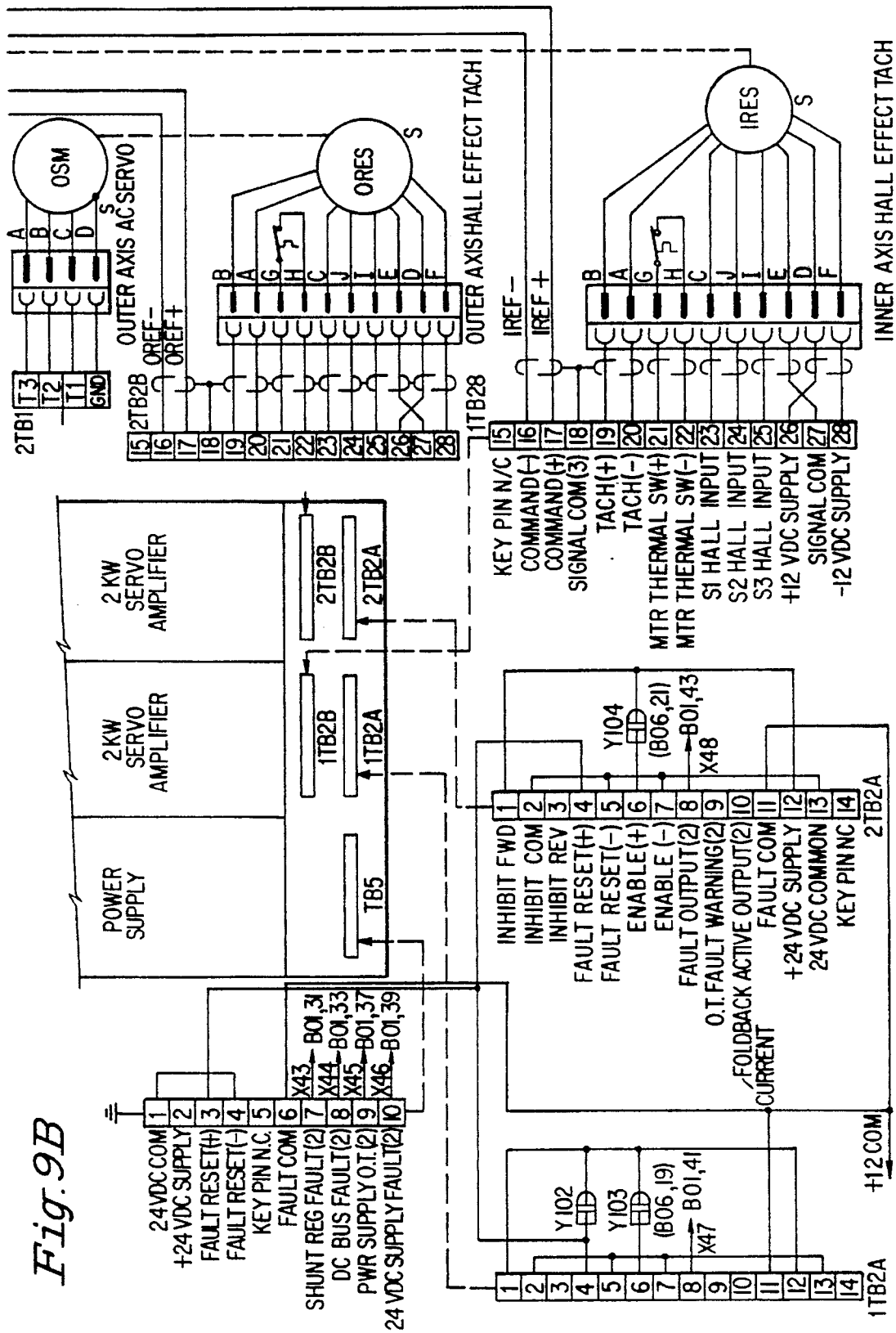
Figure 10:
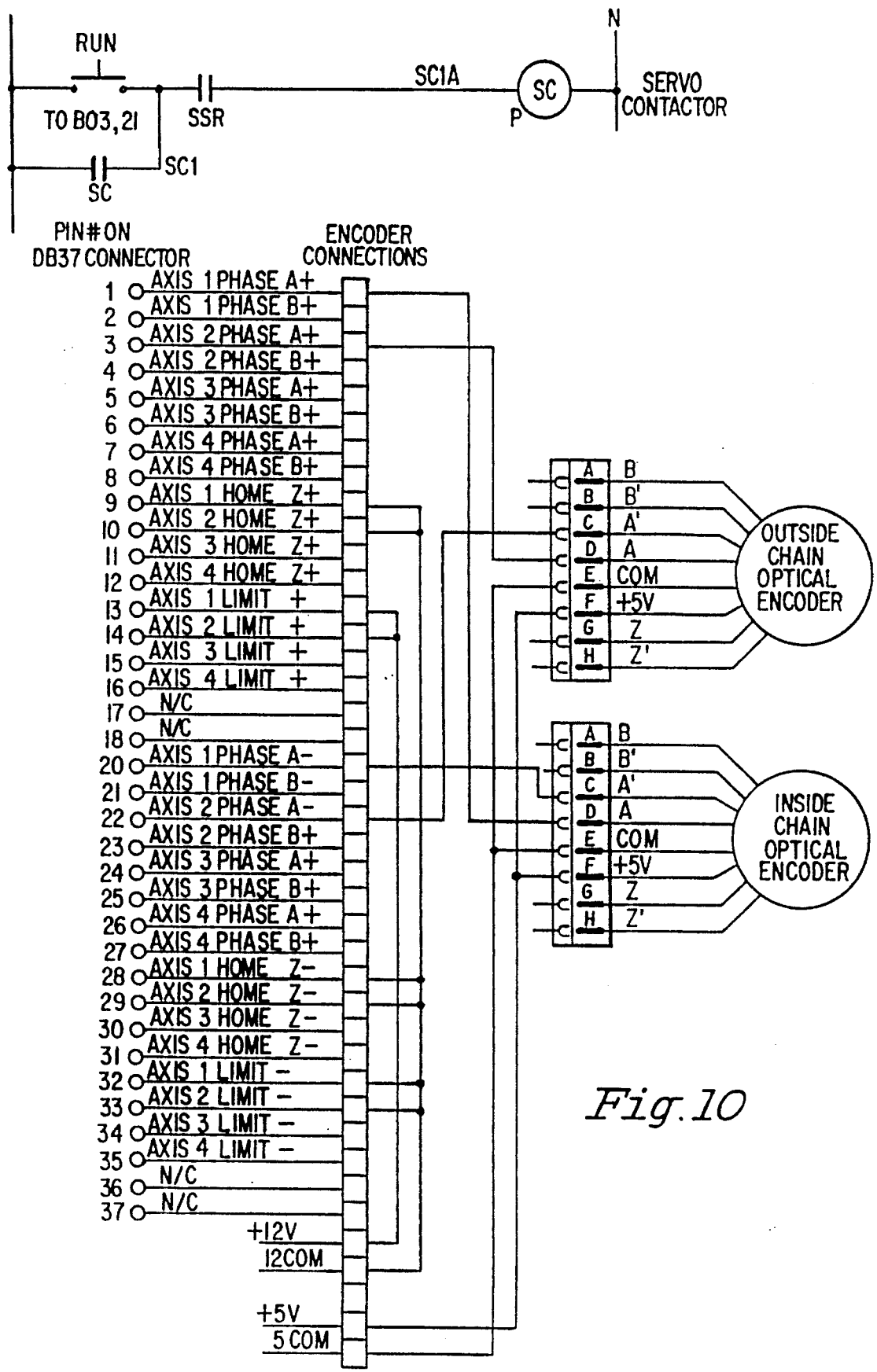
Figure 11:
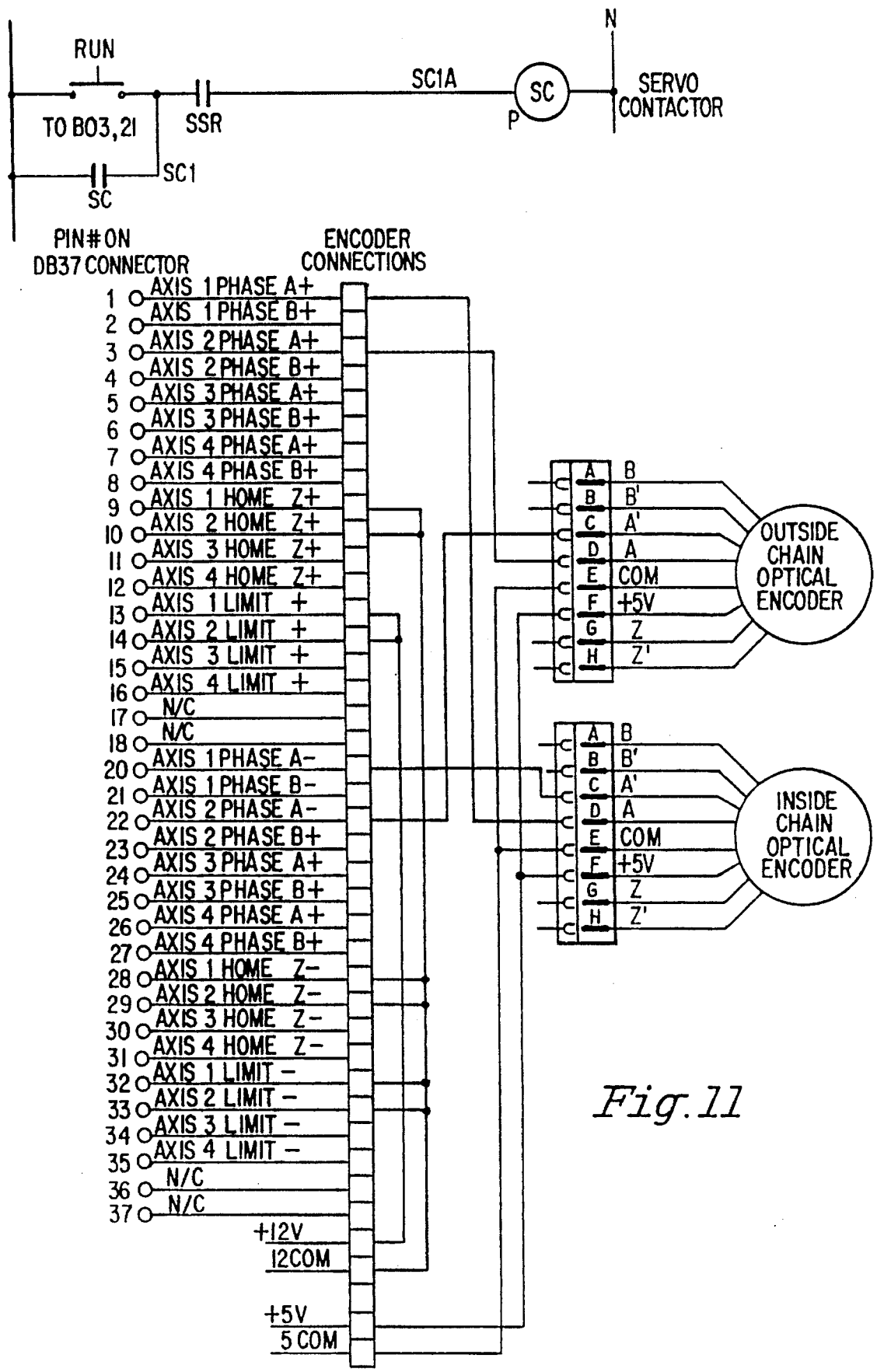

The operation of CPU 62 and associated elements of control 17 may also be implemented using a programmable controller such the 545 PCL control unit manufactured by Texas Instruments. FIGS. 9 and 10 illustrate the logic flow which maybe used with a control unit implemented by a PCL. FIG. 11 illustrates the DC inputs to such a PCL implementation.

A multi-tasking type computer would also be appropriate.

In the apparatus of the present invention, the various speed, alignment and photocell/proximity detector signals described above with reference to FIG. 1 are used to trigger interrupts which cause CPU 62 to interrupt its current activity and respond to the interrupting signal. These signals are provided to control unit 17 via control signal input channels 68 illustrated in FIG. 6. The level of priority to be given the respond is a function of task scheduler 71. A misalignment signal, for example, may require a higher priority and faster CPU response than a minor speed variation signal. The resulting control signals which respond to the interrupting signals are provided via control signal output channels 65 illustrated in FIG. 6.

Figure 7:
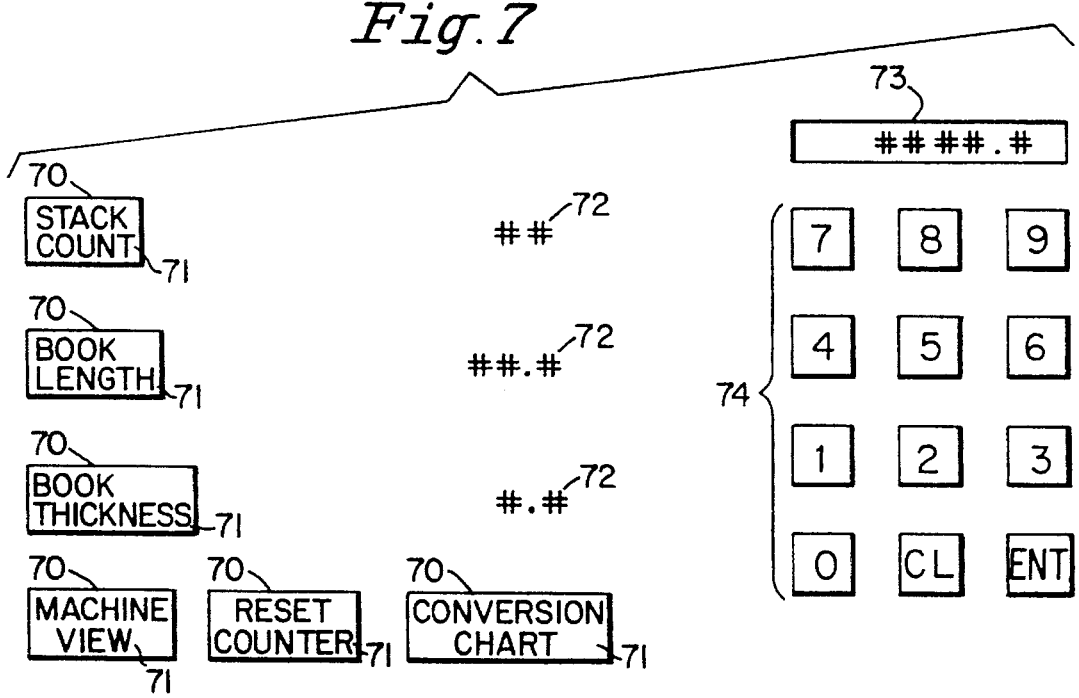
FIG. 7 is an illustration of one embodiment of a touch screen panel used with the stacking apparatus illustrated in FIG. 1.

Keyboard 66 shown in FIG. 6 is used to input various parameters to the apparatus associated with the book stacking operation. These parameters include stack count which establish the number of books in a stack and book length and thickness which allows control unit 17 to control the timing and movement of chains 8 to accomplish the stacking operation. Display 64 is used to display various information to the user. Keyboard 66 and display 64 may, however, be formed together into a touch screen/display panel. FIG. 7 illustrates one embodiment of such a panel.

As shown in FIG. 7, the panel includes a plurality of touch points 70, each one adjacent a corresponding legend 71 which describes the function of the touch point. Some functions also have a corresponding display value 72 as illustrated by the Stack Control, Book Length and Book Thickness touch points. There is also provided a calculator-type digital input keypad 74 and display area 73. In order to select a particular function, the user merely touches the corresponding touch point. If the function has a display value, the value can be changed using keypad 74.

Keypad 74 and display 73 may also be used to perform normal calculator functions as a convenience to the user or to assist the use to convert units of measurement, e.g., english to metric and metric to english.

It is envisioned that the touch screen/display panel illustrated in FIG. 7 (for example, a Luminance Electrosystems Model 7000 ST) may be programmed by CPU 62 to have a number of modes, including a set-up mode for setting up the book stacking apparatus, a run mode for providing operating and status information while the apparatus is running and diagnostic mode when problems arise. The touch screen/display panel may also be used to graphically display the location of various fault conditions in the stacking apparatus of the present invention.

Printer 67 illustrated in FIG. 6 may be provided in order to obtain a hard copy printout of status, count and diagnostic information. Printer 67 may also be used for hard copy data logging when a permanent record of the performance of the stacking is need. Status and diagnostic information storage and data logging may also be accomplished by mass storage devices 70.

Telephone modem 69 illustrated in FIG. 6 is provide so that communications with the stacking apparatus can be conducted from a remote location. Modem 69 allows for automatic upload of status and diagnostic information for analysis at the remote location. In addition, set-up parameters may be established and communicated to the stacking apparatus from the remote location. Thus, modem 69 allows for the stacking apparatus of the present invention to be part of a larger manufacturing data and control system.

Figure 8:
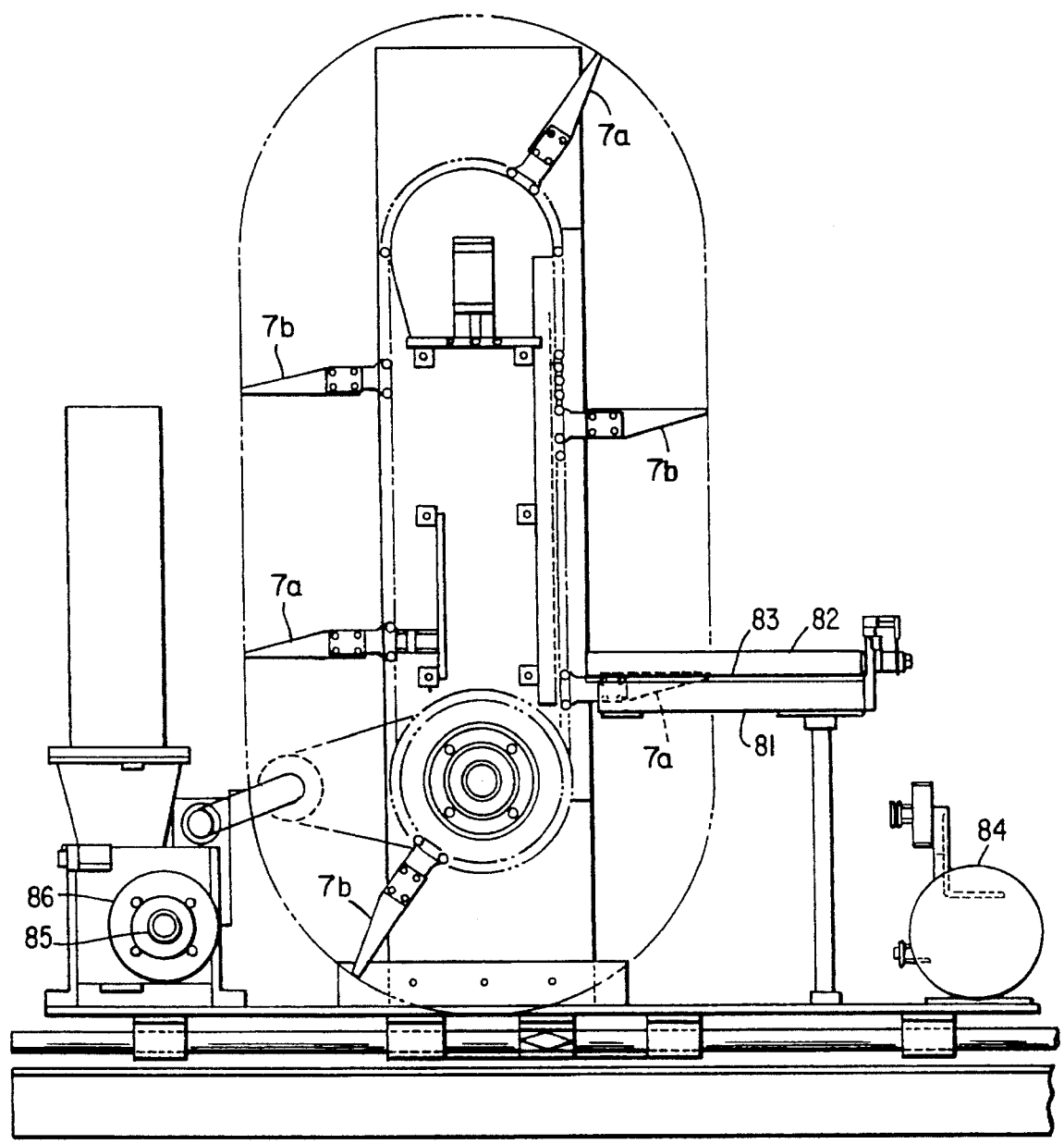
FIG. 8 is a cross-sectional view of the stacking mechanism and stacking region of the stacking apparatus illustrated in FIG. 1.

FIG. 8 illustrates the operation of forks 7 and stacking region 5 of the apparatus of the present invention in greater detail. A first pair of forks 7a (carried, for example, by chains A and C shown in FIG. 5B) is positioned in a "home" position within stacking region 5 and accumulates a predetermined number of books to form a stack. A second pair of forks 7b (carried by chains B and D shown in FIG. 5B) is in a "waiting" or "pre-home" position.

As each book arrives in stacking region 5 and is received by forks 7a, a book drop signal is generated from book detector 80. This signal is provided to control unit 17 which moves the associated chains so that forks 7a are lowered by the approximate thickness of a book. By the time the predetermined number of books which form the stack is received and accumulated on forks 7a, the forks 7a have been lowered so that the bottom most book in the stack rest on stacking platform 6.

If as FIG. 5A forks 7a are then carried away from stacking region 5 by chains A and D and are replaced by forks 7b carried by chains B and C. A new pair of forks 7c carried by chains A and D arrive at the "waiting" position. This process continues until all of the books in the stream have been stacked.

It should be obvious that although the chains set A and D, and B and C are shown, the chains sets could be A and C and B and D and be within the scope of the present invention.

The use of separate chain pairs to carry corresponding pairs of forks allow for more precise and rapid movement of the forks in and out of stacking region 5.

Figure 12:
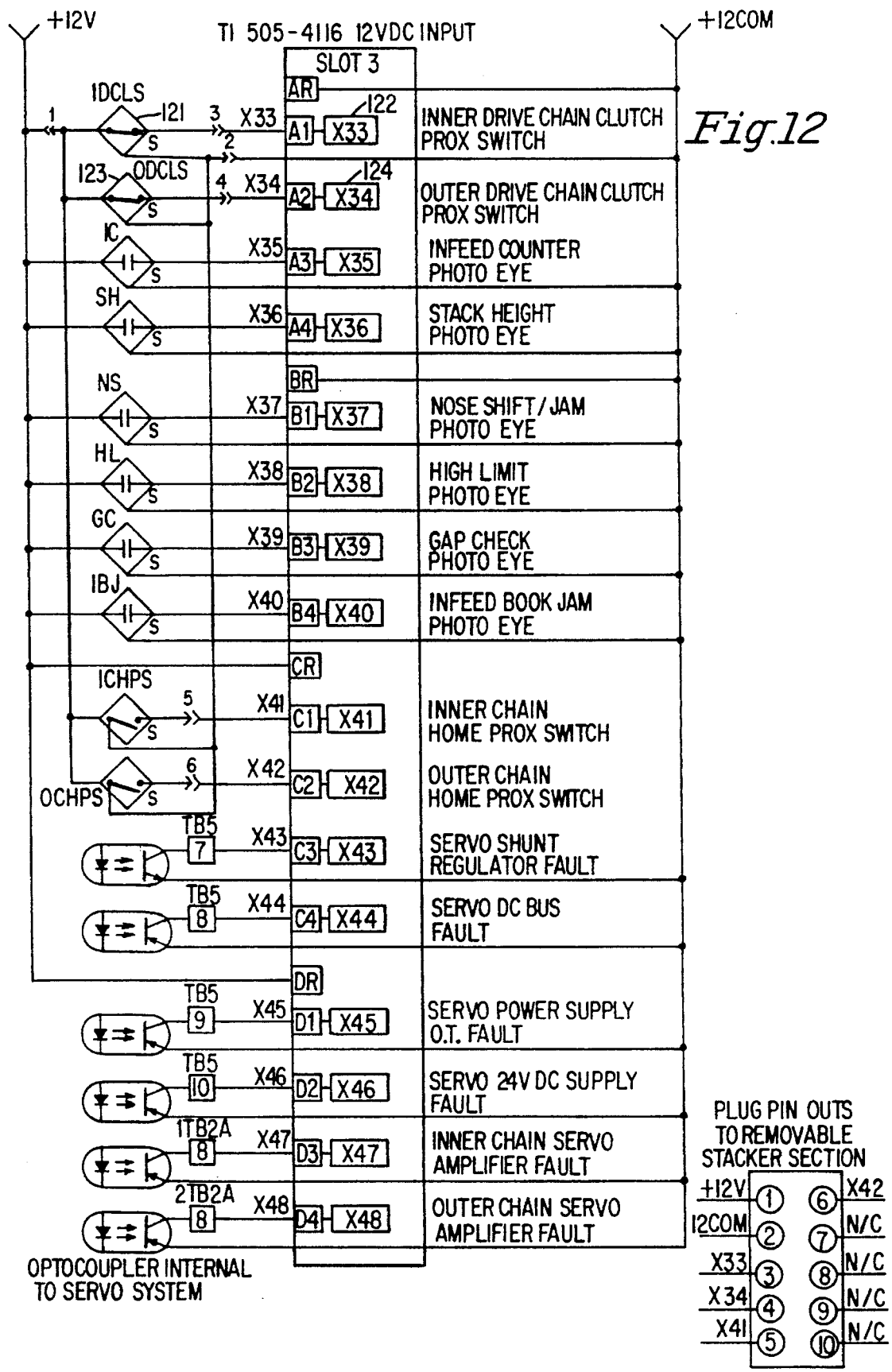
FIG. 12 illustrates the DC inputs to the control unit in one embodiment of the present invention.

The clutch sensor is shown in FIG. 12 at IOCLS, part 121 with switch X33, part 122, and ODLS, part 123 with switch X34, part 124.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

At the bottom of the stacking region is the frame support 81 above which is conveyor stand 82 with rollers 83. These delivery rollers deliver each stack of books down a conveyor perpendicular to the plane of the drawing, to a book packing station. The delivery conveyor is driven by motor 84 shown in the lower right of the figure.

I claim:

1. A real time sensor-based apparatus for stacking books delivered to said apparatus in a stream, each said book having a thickness, said apparatus comprising:

a stacking region;

first and second fork means for intercepting a predetermined number of said books to form a stack;

first and second carrier means for separately moving respective said first and second fork means cyclically to and from said stacking region in accordance with real time control signals;

real time control means for providing said control signals, said control signals including sequential signals in a cycle:

(i) controlling said first carrier means to locate said first fork means within said stacking region to form a first said stack, said formation occurring by said real time sensors signaling each time that each said book has been delivered to said stacking region and that said first fork means be moved down the thickness of said book each time until said predetermined number of books forming said first said stack has been formed, and controlling said second carrier means to locate said second fork means away from said stacking region while said first fork means is within said stacking region;

(ii) controlling said first carrier means to move said first fork means away from said stacking region after said first stack is formed;

(iii) controlling said second carrier means to locate said second fork means within said stacking region to form a second said stack, said formation occurring by said real time sensors signaling each time that each said book has been delivered to said stacking region and that said second fork means be moved down the thickness of said book until said predetermined number of books forming said second said stack has been formed, and controlling said first carrier means to locate said first fork means away from said stacking region while said second fork means is within said stacking region, and (iv) controlling said second carrier means to move said second fork means away from said stacking region after said second stack is formed;

wherein said first and second fork means are in substantially the same dimensions of vertical attitude and horizontal plane within said stacking region when each said stack is being formed, and said first and second fork means could theoretically overtake each other during a cycle since they (i) operate parallel to each other, and (ii) each said first and second fork means is not able to contact the other.

2. The apparatus of claim 1 further comprising stacking platform means within said stacking region for holding said stack after each said first and second fork means has vacated said stacking region.

3. The apparatus of claim 1, wherein said first and second carrier means separately each form a closed loop path, a portion of each of said closed loop paths being within said stacking region.

4. The apparatus of claim 3, wherein said first and second fork means are carried by said first and second carrier means respectively along said respective closed loop paths in accordance with said control signals.

5. The apparatus of claim 4, wherein said first and second carrier means are each formed of a least one chain.

6. The apparatus of claim 1, wherein said first fork means is formed of a pair of forks and said first carrier means is formed of a pair of carriers, each of said carriers carries a respective one of said pair of forks.

7. The apparatus of claim 6, wherein each of said carriers separately form a closed loop path, a portion of each of said closed loop paths being within said stacking region, wherein said forks are carried by said carriers along said closed loop paths in accordance with said control signals.

8. The apparatus of claim 7, wherein said second fork means is formed of a pair of forks and said second carrier means is formed of a pair of carriers, each of said carriers carries a respective one of said pair of forks.

9. The apparatus of claim 8, wherein each of said carriers of said second carrier means separately form a closed loop path, a portion of each of said closed loop paths being within said stacking region, wherein said forks of said second fork means are carried by said carriers of said second carrier means along said closed loop paths in accordance with said control signals.

10. The apparatus of claim 9, said closed loop paths having sections, wherein each respective section of said closed loop paths of each of said carriers are in substantially the same vertical and horizontal plane.

11. The apparatus of claim 10, wherein all of said closed loop paths include a vertical linear portion, said vertical linear portion being located in said stacking region.

12. The apparatus of claim 1, said control means further comprising real time sensor means to slow or stop whichever said fork means is within said stacking region and said apparatus further comprising alignment means for aligning the position and closed status of each said book of said books during stacking.

13. The apparatus of claim 12, wherein said sensor means including a sensor having an output signal which produces a dropped-book signal when a book has been delivered to said stacking region and wherein a respective fork means is lowered by said thickness upon said dropped-book signal.

14. The apparatus of claim 12, wherein said alignment means includes book cover restriction means for restricting the position of the cover of said books to ensure that each said cover is securely fitted to each said book.

15. The apparatus of claim 1, wherein said control means includes:

logic means for processing data;

data input means coupled to said logic means for providing input data to said logic means; and data output means coupled to said logic mean for providing output data which has been processed by said logic means, wherein said out data is used to provide said control signals.

16. The apparatus of claim 15, wherein said logic means includes a microprocessor and a stored control program.

17. The apparatus of claim 16, wherein said data input means includes data entry means for entering book stacking parameters.

18. The apparatus of claim 17, wherein said book stacking parameters includes said predetermined number of said books.

19. The apparatus of claim 17, wherein said book stacking parameters includes the width of said books.

20. The apparatus of claim 19, wherein said book stacking parameters includes the height of said books.

21. The apparatus of claim 17, wherein said book stacking parameters includes the actual real time delivery speed of said books to said stacking region.

22. The apparatus of claim 21, further comprising a book-closeness sensor which produces an output signal upon said sensor detecting books delivered too close together in said stream, wherein said delivery speed is slowed from said delivery speed parameter upon said output signal.

23. The apparatus of claim 15, wherein said data input means includes status signal input means for entering status signals indicating an operating condition of said apparatus.

24. The apparatus of claim 23, wherein said status signals include the actual real time delivery speed of said books to said stacking region.

25. The apparatus of claim 23, wherein said status signals include an operating fault condition.

26. The apparatus of claim 15, wherein said control means further includes display means for displaying the status to a user.

27. The apparatus of claim 1, further including remote monitoring means for monitoring an operating state from a remote location.

28. The apparatus of claim 27, wherein said remote monitoring means includes a modem.

29. The apparatus of claim 27, further including remote control means for controlling the operation from a remote location.

30. The apparatus of claim 29, wherein said remote control means includes a modem.

31. The apparatus of claim 1, wherein said apparatus is part of a manufacturing and data control system.

32. The apparatus of claim 1, wherein one of said carrier means physically surrounds the other said carrier means.

33. The apparatus of claim 1, further comprising sensor to detect fault conditions.

34. The apparatus of claim 33, further comprising means to slow the input delivery speed of said books.

35. The apparatus of claim 1, further comprising servo control means coupled to said control means for controlling the operation of both said carrier means.

36. An apparatus for stacking books delivered to said apparatus in a stream, said apparatus comprising:

a stacking region;

first and second fork means for intercepting a predetermined number of said books to form a stack, first and second carrier means for separately moving respective first and second fork means to and from said stacking region in accordance with real time control signals;

real time control means for providing said control signals, said control signals including signals for controlling said first carrier means to locate said first fork means within said stacking region to form a first said stack, controlling said second carrier means to locate said second fork means away from said stacking region while said first fork means is within said stacking region, controlling said first carrier means to move said first fork means away from said stacking region after said first stack is formed, controlling said second carrier means to locate said second fork means within said stacking region to form a second said stack, and moving said second fork means away from said stacking region after said second stack is formed; and wherein said first and second fork means are in substantially the same dimension of vertical attitude and horizontal plane within said stacking region when said stack is being formed, and said first and second fork means could theoretically overtake each other during a cycle since they (i) operate parallel to each other, and (ii) each said first and second fork means is not able to contact the other.

37. An apparatus for stacking books delivered to said apparatus in a stream, each said book having a thickness, said apparatus comprising:

a stacking region;

first and second carrier means formed in separate continuous closed loom paths, a portion of each of said closed loop paths being within said stacking region;

first and second fork means attached to respective said first and second carrier means, said fork means being carried by said carrier means along said closed loop paths in accordance with real time control signals; and real time control means for providing said control signals, said control signals including sequential signals in a cycle:

(i) controlling said first carrier means to locate said first fork means within said stacking region for intercepting a predetermined number of said books to form a first stack; and controlling said second carrier means to locate said second fork means away from said stacking region while said first fork means is within said stacking region, (ii) controlling said first carrier means to move said first fork means away from said stacking region when said first fork means has intercepted said predetermined number of said books, (iii) controlling said second carrier means to locate said second fork means within said stacking region for intercepting said predetermined number of said books to form a second stack, and controlling said first carrier means to locate said first fork means away from said stacking region while said second fork means is within said stacking region, and (iv) controlling said second carrier means to move said second fork means away from said stacking region after said second stack is formed;

wherein said first and second fork means are in substantially the same dimensions of vertical attitude and horizontal plane within said stacking region when each said stack is being formed, said first and second fork means could theoretically overtake each other during a cycle since they: (i) operate in parallel to each other, and (ii) each said first and second fork means is not able to contact the other; and stacking platform means within said stacking region for holding said stack after said first and second fork means has vacated said stacking region.

* * * * *